United States Patent Office 3,086,428
Patented Apr. 23, 1963

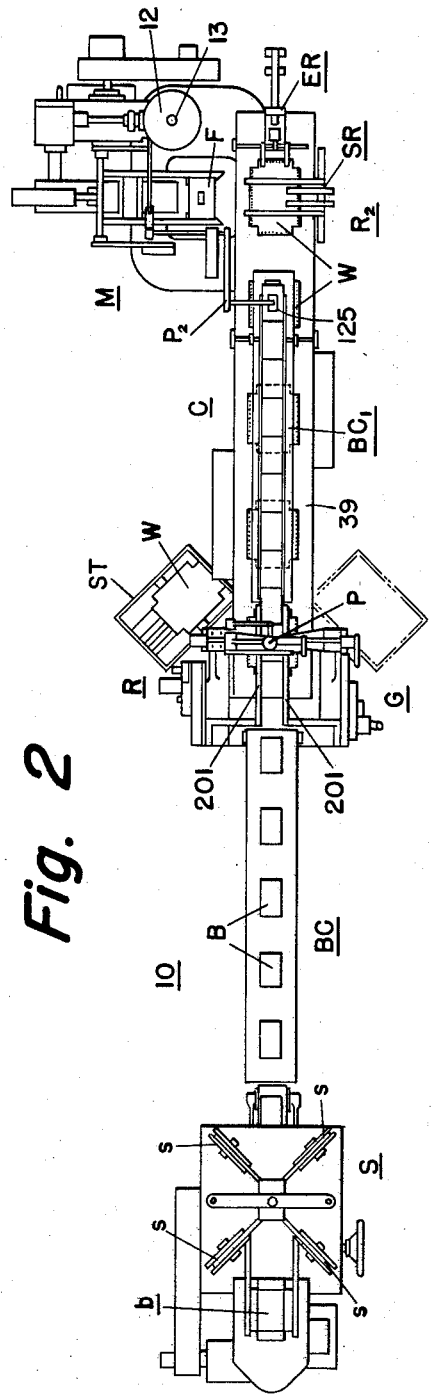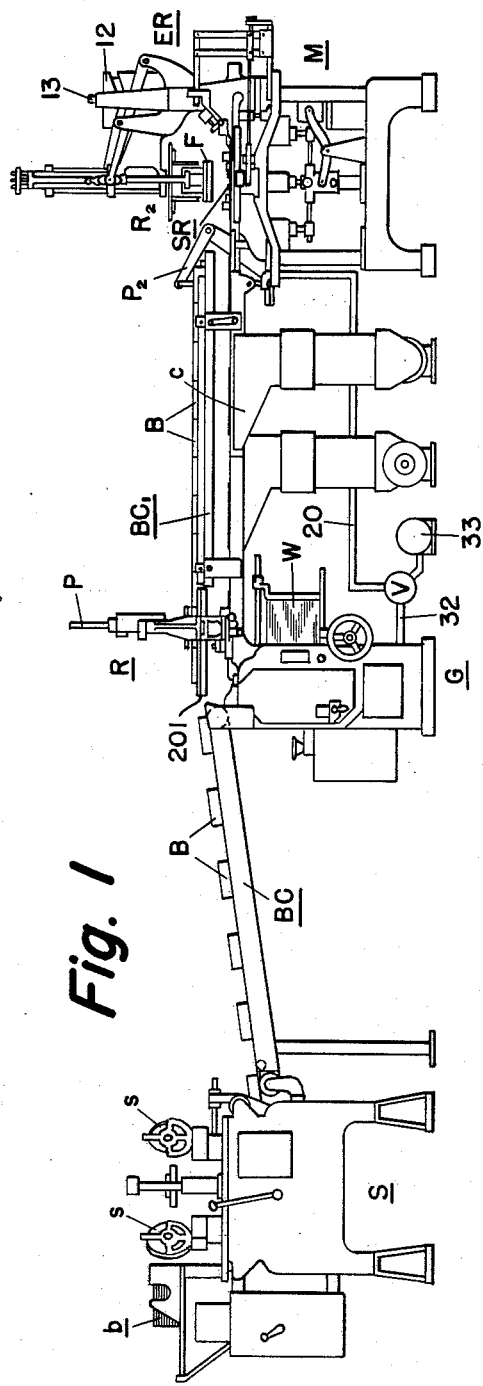

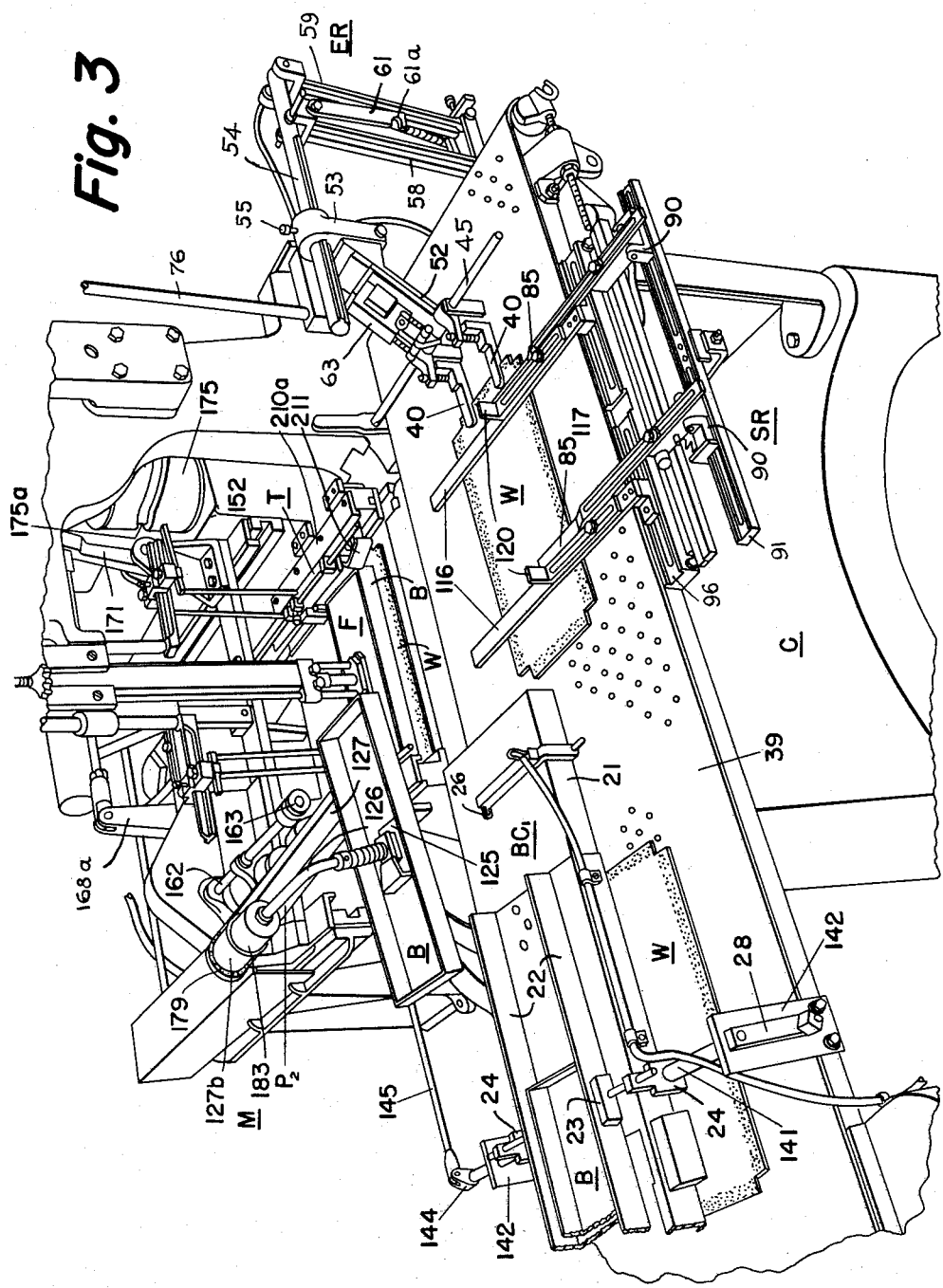

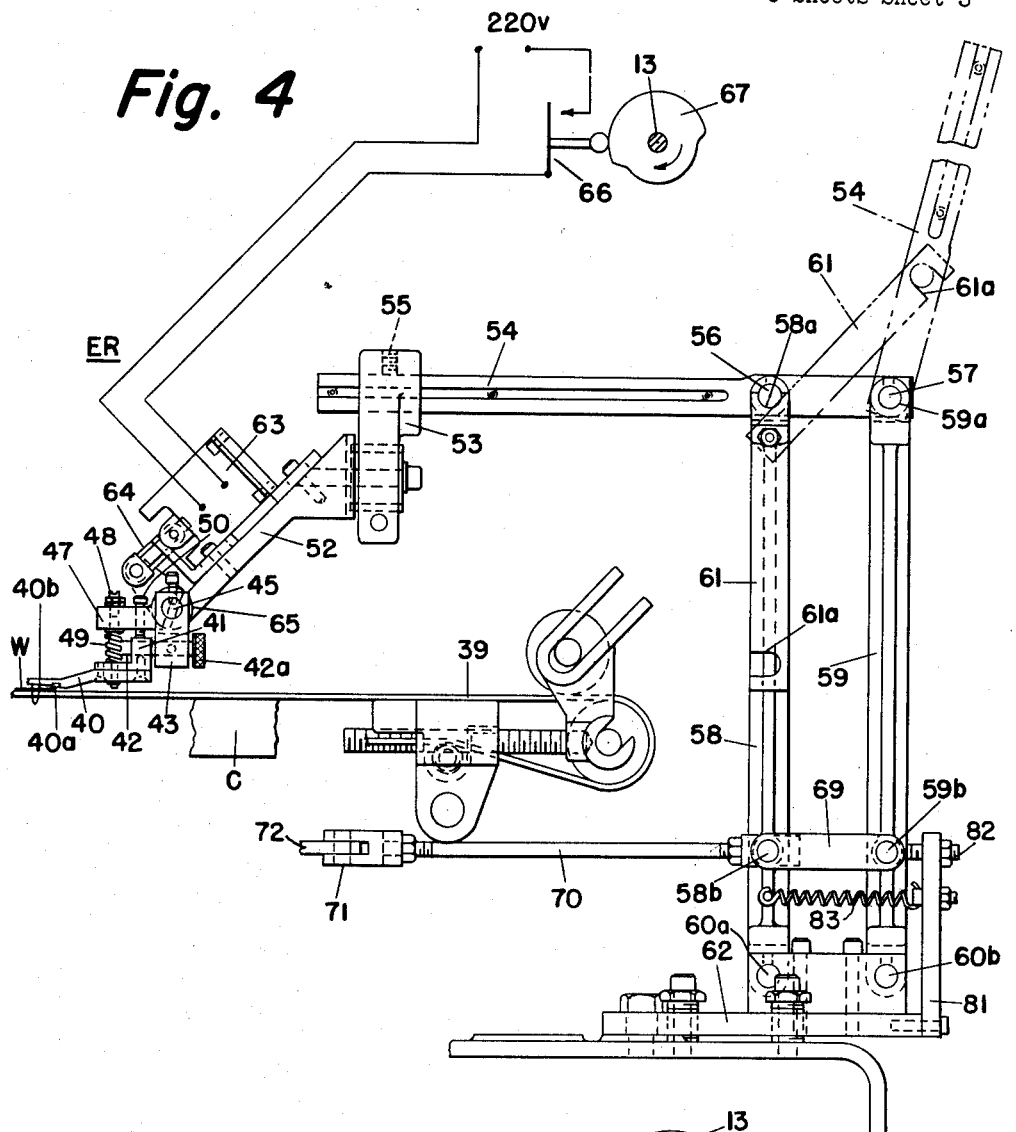
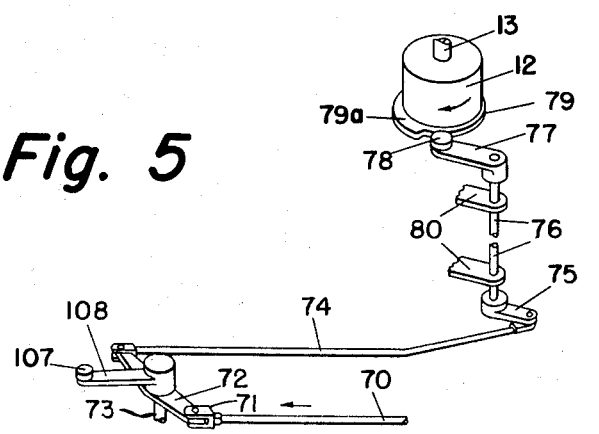

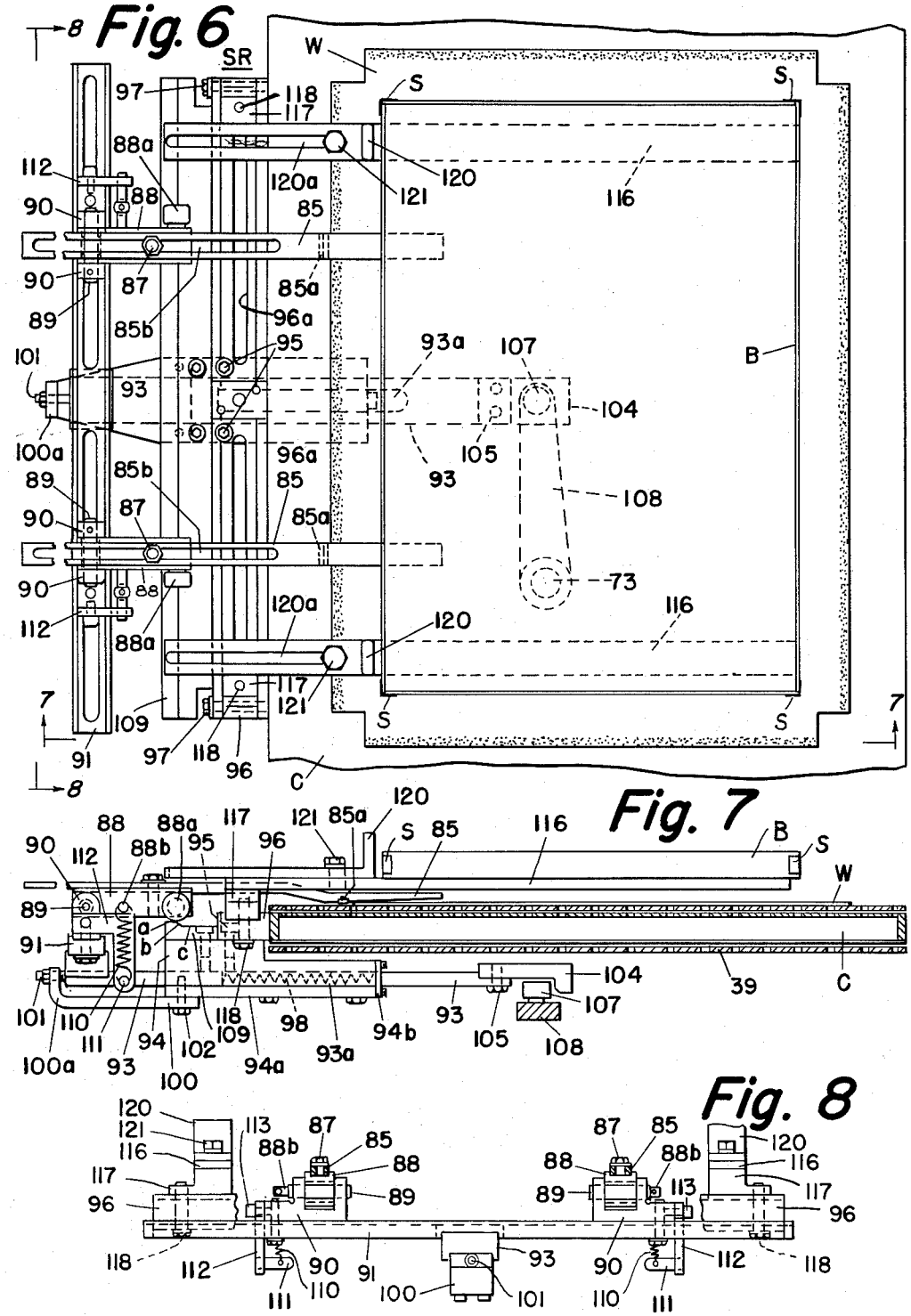

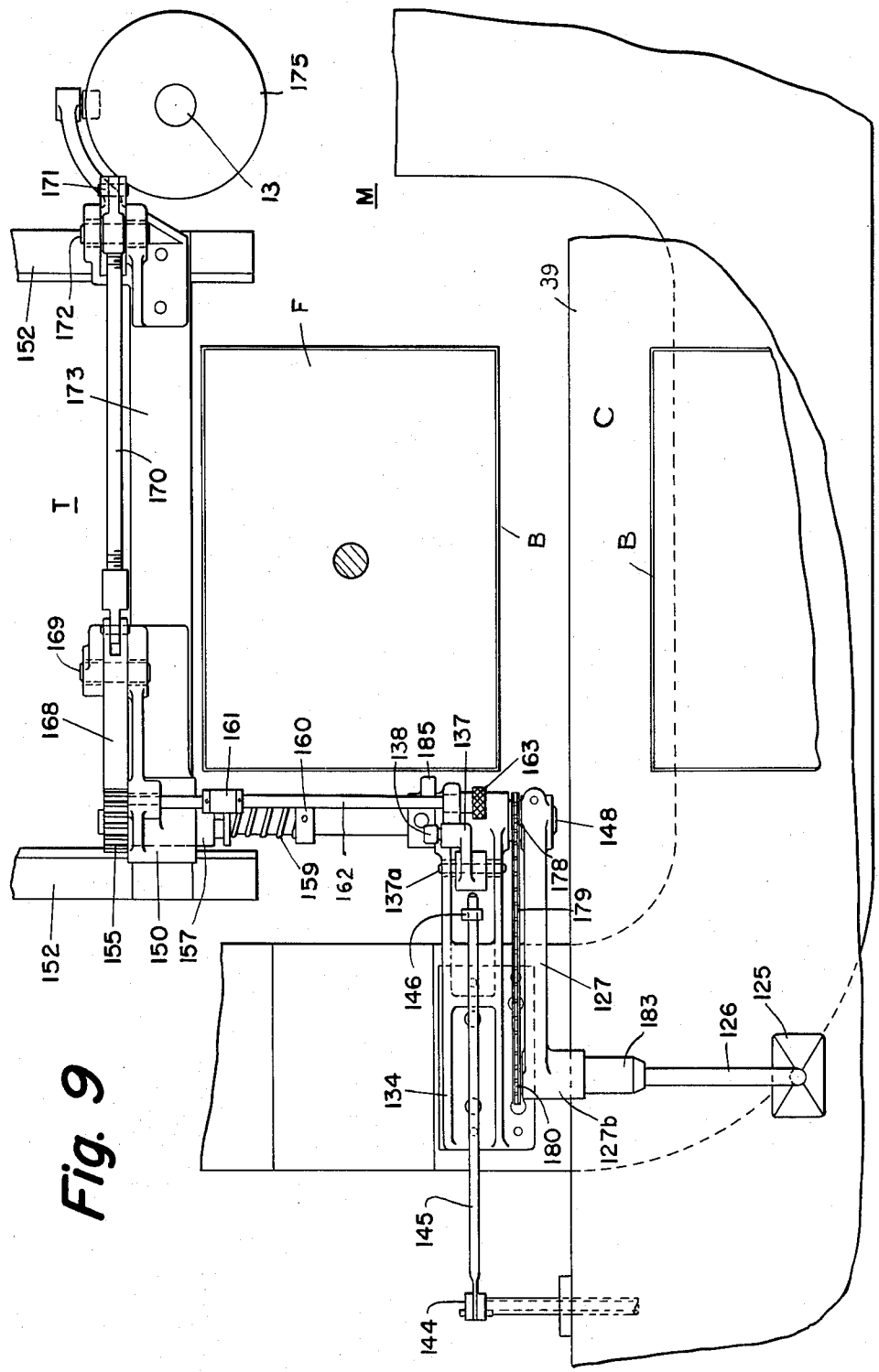

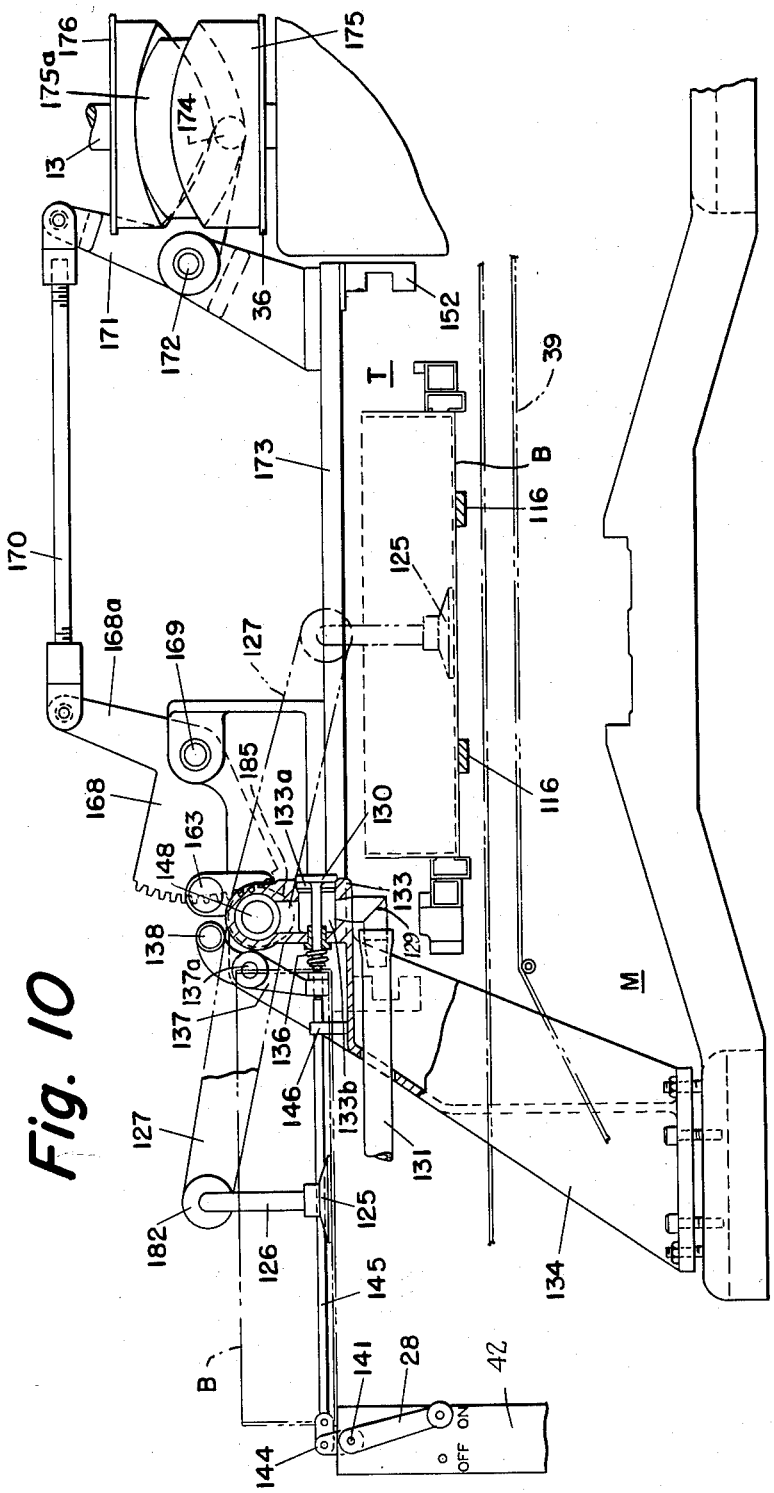

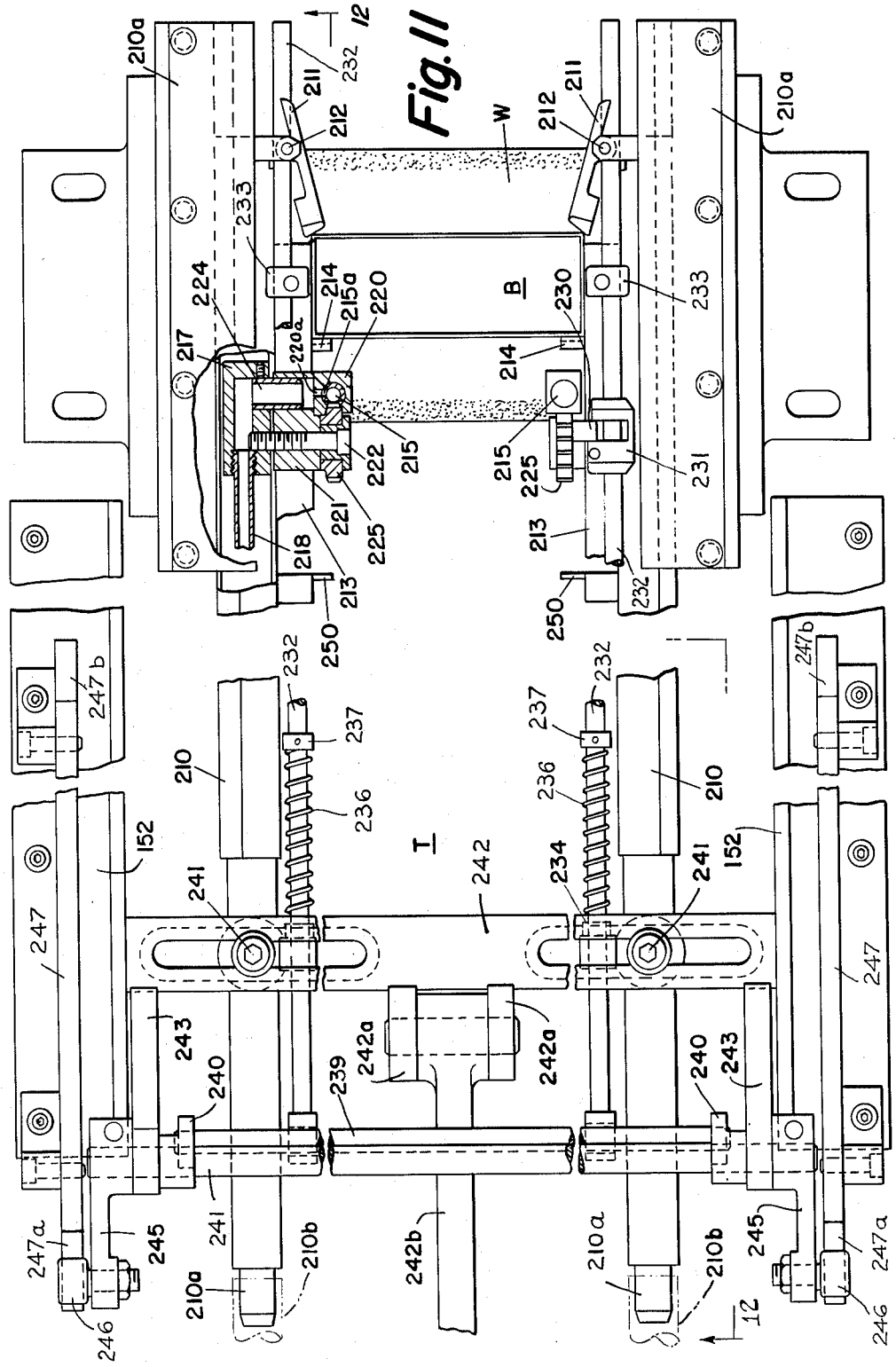

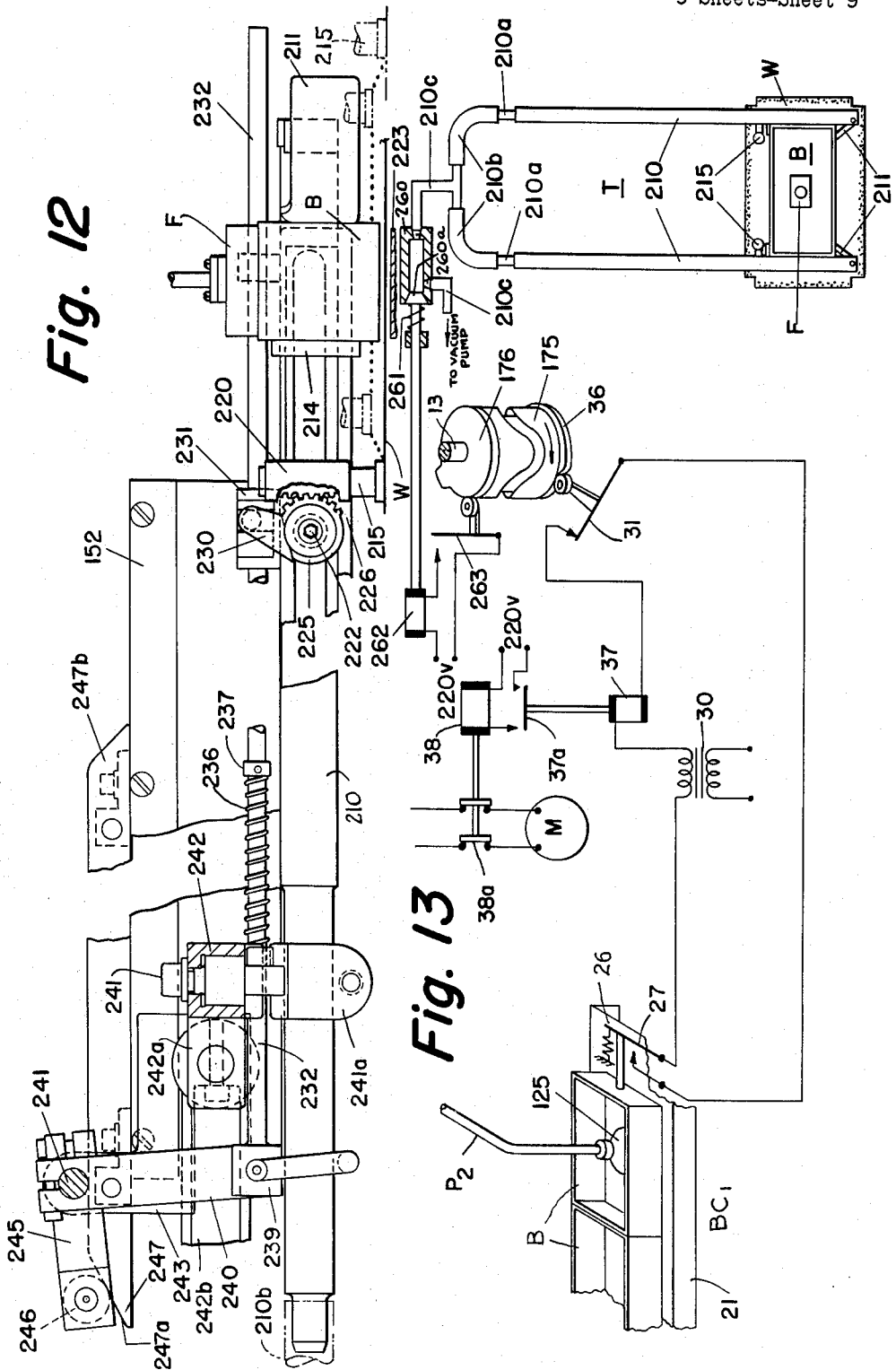

3,086,428
BOX-WRAPPING SYSTEM FOR LOOSE-WRAP WORK
Jonathan Y. Albertson, Abington, Ludwig H. Lange, Rockledge, Leslie E. Lord, North Willow Grove, and Roy Schempp and James W. Steck, Philadelphia, Pa., assignors to FMC Corporation, a corporation of Delaware
Filed May 20, 1960, Ser. No. 30,672
12 Claims. (Cl. 93—54)

This invention relates to an automatic box-wrapping system and has for an object the provision of an improved box-wrapping system particularly suited for "loose-wrap" work. In the box-making art, the term "loose-wrap" is used to designate those boxes whose wrappers are secured thereto only on the portions of the wrapper which extend inside of the box. The remaining portions of the wrapper cover the exterior of the box but are "loose" with respect to it. For "loose-wrap" work, the adhesive pattern on the wrapper is such that the adhesive is only applied around the edges of the wrapper and not in the center of the wrapper. For boxes in which all portions of the wrapper adhere to the box, such boxes are known in the trade as "tight-wrap" work and their wrappers are provided with an overall coat of adhesive.

An example of a full automatic box-wrapping system for tight-wrap work is disclosed in William F. Andresen, Jr., et al. U.S. Patent No. 2,867,158. The present invention is an improvement upon automatic systems of that type as the present invention enables both loose-wrap and tight-wrap work to be done on the same system. The present invention, in certain respects, is also an improvement on systems of the type disclosed in application Serial No. 30,648 filed concurrently herewith by Roy Schempp, which issued as Patent No. 3,-045,561, dated July 24, 1962.

In general, loose-wrap work provides a better-appearing finished box and at a lower manufacturing cost as less adhesive is required on the wrapper. In view of the fact that automatic box-wrapping equipment is relatively expensive, it is desirable that the same equipment be adapted for producing both loose-wrap and tight-wrap work.

The present invention is particularly concerned with the loose-wrapping of "set-up boxes" with predetermined steps being taken to insure that the wrapper, regardless of shape and material, is in precise register with the box from the time the box and wrapper leave the transfer station until the adhesive portions of the wrapper are secured to the box at the wrapping station to produce a completed loose-wrap box. The term "set-up" is used in the art to designate box blanks which have been formed with vertical walls and the corners formed by the ends of adjacent walls having stays or other suitable attaching means secured thereto for holding the walls in upright or vertical position.

In accordance with the present invention, there is provided an automatic box-wrapping system particularly suited for the loose-wrapping of set-up boxes. This system includes a box conveyor for cyclically moving set-up boxes along a path with stop means for interrupting the movement of the boxes at a predetermined location on the path displaced in the direction of travel from a transfer station. The system also includes a wrapper conveyor for cyclically feeding wrappers in succession below the box conveyor, the wrappers having unset adhesive along the edges of their upper surface. Extending over the wrapper conveyor at the transfer station is means for interrupting the movement of the wrappers. The system further includes reciprocating means movable between the predetermined location and the transfer station for moving the boxes in succession over and downwardly into spaced register with the corresponding wrappers, and transfer means movable transversely of both of the conveyors and the transfer station for transferring in succession each box and wrapper in registered spaced relation from the transfer station to a wrapping station. The system further includes means at the wrapping station for bringing the wrapper into contact with the box and applying the adhesive-coated portions of the wrapper to the box in completion of the wrapping thereof.

In accordance with a further aspect of the invention, the reciprocating means for moving the boxes into register with corresponding wrappers is of the swinging plunger type which is positioned to one side of the wrapping station, thus permitting free access to the box-wrapping machine for adjustment or maintenance and for operation of the system in connection with tight-wrap work. The boxes are not placed in contact with the wrapper at the transfer station, but instead are placed on supports which extend over the transfer station at a height above the surface of the wrapper. Before the box is placed on the supports in registered position over the wrapper, the wrapper is positioned both lengthwise and sidewise by register fingers. The box and wrapper are picked up in their registered spaced relation at the transfer station and during the transfer to the wrapping station, the wrapper is raised or elevated towards the bottom of the box to insure that the wrapper will clear the platen of the wrapping machine. Upon arrival of the box and wrapper at the wrapping station the wrapper is again lowered to its original position as at the transfer station and thus when the wrapper is applied to the box, it is precisely centered therewith and insures perfect accuracy in wrapping. Such accuracy cannot be accured when the box is placed directly on the wrapper at the transfer station prior to being transferred to the wrapping station as the box plunger may cause displacement of the wrapper from its registered position. There are various novel features of the loose-wrap registering devices and the transfer mechanism which all contribute to the automatic registration and assembly of the set-up box and its associated wrapper as will hereinafter be pointed out and described more in detail.

For a more detailed disclosure of the invention and for further objects and advantages thereof, reference may be had to the following description, taken in conjunction with the accompanying drawings, in which:

FIG. 1 is a side elevation of a box-wrapping system embodying the present invention;

FIG. 2 is a top plan view of FIG. 1;

FIG. 3 is a perspective view of the transfer station and box-wrapping station of the system shown in FIGS. 1 and 2;

FIG. 4 is a front elevation of the end-registering mechanism as viewed in FIG. 1;

FIG. 5 is a perspective view of the drive mechanism for the side register;

FIG. 6 is a top plan view of the side register of FIG. 3;

FIG. 7 is a sectional view, taken along the lines 7—7 in FIG. 6;

FIG. 8 is a side elevation as viewed from 8—8 in FIG. 7;

FIG. 9 is a top plan view of the box transfer device;

FIG. 10 is a front elevational view partly in section of FIG. 9;

FIG. 11 is a top plan view of the box and wrapper transfer mechanism;

FIG. 12 is a sectional view taken along the lines 12—12 in FIG. 11; and

FIG. 13 is a schematic view of the electrical system for stopping the wrapping machine in the event no boxes are delivered to the transfer station.

Figure 9A:
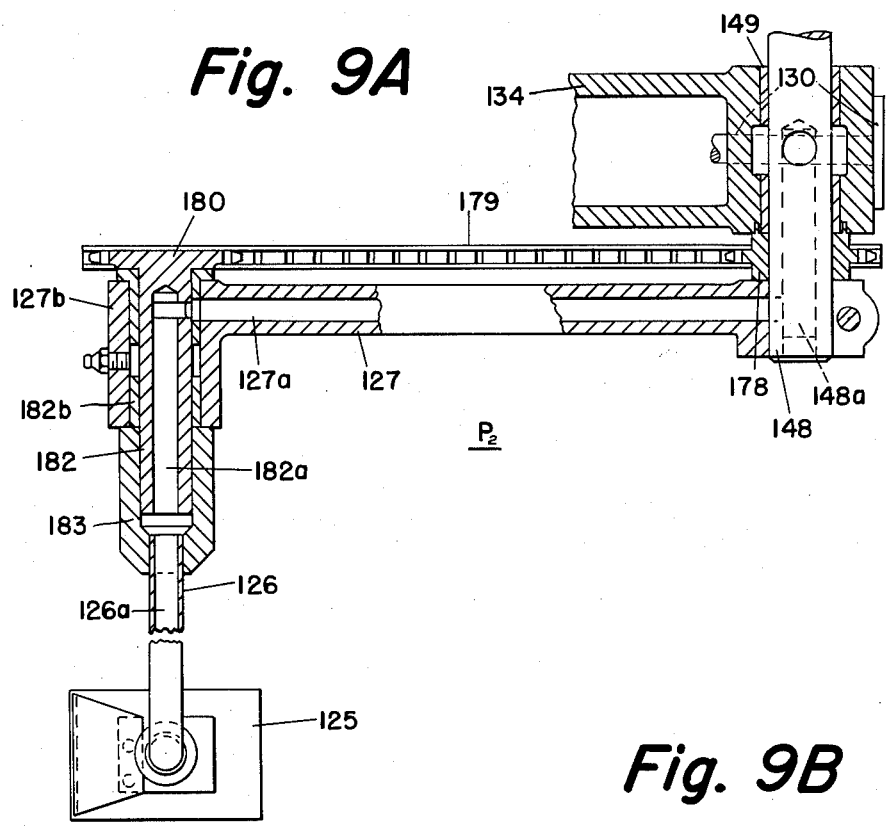
FIG. 9A is a fractional sectional view of the box transfer arm in FIG. 9.

As mentioned above, the present invention is an improvement on the automatic box-wrapping system disclosed in Andresen, Jr., et al. Patent 2,867,158 to enable the tight-wrap system disclosed therein additionally to be able to perform loose-wrap work. Referring to FIGS. 1 and 2, it will be seen that in many respects, the present box-wrapping system 10 is generally similar to the automatic box-wrapping system disclosed in said Andresen Jr. et al. patent. As in the case of the aforesaid patent, the present system includes as components thereof a stayer S, a box conveyor BC, a gluer G, a suction conveyor C for the wrappers, a box-registering device R and a box-wrapping machine M. In addition, the present invention includes a second box-registering station $R_2$ and an extension $BC_1$ for the box conveyor extending between the two box-registering stations R and $R_2$. All of these components are cyclically-operated in timed relation. The various components of the present box-wrapping system 10 which correspond to those in the aforesaid patent are of similar construction and operation and thus it is not believed necessary to elaborate upon their details here as their description is hereby incorporated herein by reference thereto.

As shown in FIGS. 1 and 2, box blanks *b* are fed to the staying machine S from a stack of blanks *b*. The staying machine S is shown as a quad stayer and thus the four corners of the box are stayed concurrently. The box blanks *b* thus automatically are transformed by the stayer S from blanks *b* in the flat to stayed set-up boxes B. As they leave the staying machine S, the set-up boxes B are delivered in succession from the staying machine onto the box conveyor BC and continue in a straight line beneath the registering device R. The wrappers are fed to the gluer G from a stacker ST as described in the aforesaid patent to Andresen, Jr., et al., No. 2,867,158. When doing tight-wrap work, the gluer G is adjusted to apply an overall adhesive coat to the wrappers W before they are placed on the suction conveyor C. The plunger P at the first registering station R forces a box B downwardly onto the adhesive-coated surface of the wrapper W. Thereafter the assemblies comprising an adhesive-coated wrapper in the flat and set-up box registered thereon are moved step-by-step by the suction conveyor C to a transfer station opposite the box-wrapping machine M, as described in the aforesaid patent.

For loose-wrap work, the set-up boxes do not stop beneath the first registering device R, but instead move therebeyond and onto the extension $BC_2$ of the box conveyor until the leading box arrives at a position adjacent the transfer station where it is adapted to receive the plunger $P_2$ of the second box-registering device $R_2$. The plunger $P_2$ is of the swinging type, as contrasted with the strictly vertical-moving straight line plunger P of the first registering device R, and is adapted to lift the box B off from the end of the extension $BC_1$ of the box conveyor and move it over and down onto box supports which maintain the box B in spaced register with the leading wrapper W which has previously been coated with a predetermined adhesive pattern for loose-wrap work and fed by cooperation of the gluer G and the suction conveyor C to the transfer station.

Prior to deposit of the box B at the transfer station, the wrapper W is registered both longitudinally and transversely of the transfer station to insure that the center lines of the wrapper W will be precisely in alignment with the center lines of the box B when it is registered on the supports above the wrapper W at the transfer station. Thereafter the registered box and wrapper in the flat are moved from the transfer station at the end of the suction conveyor C to the wrapping station of the box-wrapping machine M.

The box-wrapping machine M is of the type shown in U.S. Patents Nos. 2,074,561 and 2,144,338 and includes an automatic transfer mechanism generally of the type described in Lange et al. Patent No. 2,705,905 with certain improvements as hereinafter described. The main cam 12 is attached to a vertical shaft 13 which is driven from a motor $M_1$, FIG. 13, through a clutch. As described in the aforesaid Patent 2,867,158, the operations of the stayer S, the gluer G and the suction conveyor C are synchronized with the operation of the box machine M by means of electromechanical connections. During each cycle of the box-wrapping machine M, the main cam 12 makes one complete revolution and the form block F, FIG. 3, comprising an upper form and a lower form, is moved from an upper position downwardly in a path adjacent various sheet-applying tools and then back to its original position. During such movement, the wrapper and the bottom of the box are clamped between the lower form block and a platen. The movement of the form block F and the relative movements with respect to each other of its components are effected by levers having cam followers which ride in cam grooves in the main cam 12, all as well-understood in the art.

The various sheet-applying tools, including side rolls, end rolls, marginal turn-in tools and pressure blocks are carried by four tool slides adjustably connected to a table of the machine M and each is provided with operating members which are controlled from a cam on the lower end of the vertical shaft 13. During each cycle of the machine M the various sheet-applying operations of the tools are effected, all as more fully shown and described in aforesaid Patent No. 2,074,561. Referring to FIGS. 1 and 2, the stayed boxes B are forwarded in succession from the box conveyor BC to box-supporting structure 201 disposed beneath the plunger P of the first registering device R. The registering device R and associated parts of the present system 10 are the same as those illustrated in FIG. 8 in the aforesaid Patent 2,867,158. For purposes of clarity, the same reference characters are used herein to designate corresponding parts in Patent 2,867,-158 and particularly in connection with those shown in FIG. 8 of that patent. For tight-wrap work, the box-supporting structure 201 is provided with box stop members for aligning the set-up boxes B beneath the plunger P. One of these stop members is provided with a suction connection, such as a suction line 32 connected to a vacuum pump 33, the latter also providing suction for feeding the wrappers W to the gluer G. As disclosed in FIG. 8 of said Patent 2,867,158, the suction line 32 is connected to a diaphragm device which is adapted to withdraw a pivoted latch member from its latching engagement with a pivoted arm which forms part of the operating mechanism for the plunger P in the registering device R.

For loose-wrap work, the stop members on the box-supporting structure 201 are removed and plunger P of the registering device R is rendered inoperative. The latter is accomplished by means of a three-way valve $V_1$ which is inserted in the suction line 32 between the vacuum pump 33 and the diaphragm device shown in FIG. 8 of said Patent 2,867,158 but not shown in the present application. The three-way valve $V_1$ is adapted to disconnect the diaphragm device with respect to the vacuum pump 33 and to connect a suction line 20, FIG. 1, with the pivoted box transfer plunger $P_2$ at registering station $R_2$. As the boxes B move onto the box-supporting structure 201, they are pushed thereacross and onto the box conveyor extension $BC_1$ by the following boxes which are being fed by the box conveyor BC. The box conveyor extension $BC_1$ has been illustrated in the form of a shelf formed by an inverted channel member 21. Extending over the top of channel 21, FIG. 3, are spaced, adjustable side guides 22 which are adapted to guide the boxes B along a predetermined path. The side guides 22 are adjustable to accommodate boxes of different widths, such adjustment being provided by the support members 23 which extend through cooperating members 24 and are locked in place by set screws.

The boxes B are pushed along over the extension box conveyor $BC_1$ until they engage the box stop 26 which is positioned at the end of the extension box conveyor $BC_1$, FIGS. 3 and 13. Until the extension box conveyor $BC_1$ is filled with boxes, the suction to the box transfer plunger $P_2$ is cut off by means of a valve operated by a hand lever 28, as later to be described. The suction conveyor C is cyclically-operated by manual control until the conveyor is filled with wrappers to which a predetermined adhesive pattern has been applied for loose-wrap work and the leading wrapper is adjacent the transfer station. During this operation the lever 28 has been maintained in position to prevent suction from being applied to the plunger $P_2$ so that the boxes B will not be transferred until a wrapper W is at the transfer station.

As may be seen in FIG. 13, the box stop 26 includes a normally-closed switch 27 which is in series circuit with the low side of a step-down transformer 30 and a normally-closed switch 31 which is adapted to be opened by a cam 36 carried by the vertical shaft 13 of the box-wrapping machine M. The switch 31 is also connected to a relay 37 having contacts 37a which in turn is connected to the low side of the step-down transformer 30. The relay 37 is in circuit with a stop solenoid 38 which in turn is connected to a circuit breaker 39 or a mechanical trip lever for stopping the wrapping machine M.

To initiate a cycle, the wrapping machine M is tripped and cam 36 moves to open switch 31. At this time switch 26 on the box stop is opened by the column of boxes B on the extension of the box conveyor $BC_1$. The transfer arm or plunger $P_2$ picks up the leading box B and moves it out of engagement with the switch 27 on the box stop 26, thus allowing the switch to close. The transfer arm $P_2$, FIG. 3, transfers the box B to a position in front of the wrapping machine M and starts to return to its position shown in FIG. 13. When the transfer arm $P_2$ is in a straight-up or vertical position, the switch 31 is permitted to close. By this time the next box B on the box conveyor $BC_1$ should have moved up against the box stop 26 and moved its switch to open position. However, if no box is present at the end of the box conveyor $BC_1$, then switches 26 and 31 both will be closed. This in turn will cause relay 37 to close contacts 37a, energizing the stop solenoid 38 and to stop the wrapping machine M. The step-down transformer 30 is employed to minimize the shock hazard for the attendant of the machine.

When the wrappers W arrive at the transfer station of the system at the end of suction conveyor C, they are registered both lengthwise and sidewise as now to be described. The end-registering device ER extends over the upper surface of the conveyor belt 39 (FIG. 3) and is spaced an infinitesimal distance thereabove so as to avoid wear on the upper surface of the belt 39 but to be sufficiently close thereto to engage the leading end of the wrapper W and stop it in registered position at the transfer station. As may be seen in FIGS. 3 and 4, the end-registering device ER includes a pair of spaced fingers 40, the forward ends of which are adapted to extend over the surface of the wrapper W. The bottoms of the fingers 40 are provided with small, vertical shoulders 40a which are adapted to engage the leading end of the wapper W. The shoulders 40a and the lower surface 40b of fingers 40 are made from an adhesive-resistant material, such for example as a polymer of tetrafluoroethylene available on the market under the tradename "Teflon." Each of the fingers 40 is supported by an L-shaped block 41 which in turn is supported by an adjusting screw 42, the latter being carried by a main block 43 and having an adjusting knob 42a. The adjusting knob 42a is adapted to move the fingers 40 lengthwise of the conveyor belt 39 for precise control of the end position of the wrapper W at the transfer station. The main supporting blocks 43 are pivotally carried by a rod 45 which extends transversely of the suction conveyor C. To control the pressure of the fingers 40, the rod 45 is also provided with members 47 which are connected with the L-shaped blocks 41 and fingers 40 by means of adjusting screws 48. The adjusting screws 48 are provided with a compression spring 49 which extends between the L-shaped block box 41 and members 47. By adjusting the screws 48, the pressure applied to the fingers 40 by means of springs 49 can be controlled. When the adjusting knobs 42a have been moved to their desired position, the L-shaped block 41 may be locked in position by means of lock screws 50. The rod 45 is supported by a bracket 52 which in turn is carried by a collar member 53 on a horizontal arm 54. The collar 53 is provided with a set screw 55 to lock the collar to the arm 54 at a location corresponding to the length of the box to be wrapped. The rear end of the arm 54 is provided with a pair of transverse pins 56 and 57 which are respectively supported by a pair of vertical members 58 and 59, the lower ends of which are pivotally connected at 60a and 60b to a support 62 disposed beneath the suction conveyor C. It will be noted that the upper end of vertical member 58 is provided with an open groove 58a of semi-circular shape, rather than a circular opening, as in the case of opening 59a at the upper end of vertical member of 59. This permits the horizontal arm 54 to be pivoted about its rear pivot 57 with the pin 56 moving to the upper position as shown in phantom lines in FIG. 4 so that the pin 56 may be engaged with a slot 61a in latch member 61 to hold the end register ER in substantially vertical position, thus permitting access to the transfer station and to the box-wrapping machine M. The suction conveyor is of the type disclosed in the aforesaid Lange et al. Patent 2,705,905 and the transfer end of said conveyor is pivoted so that it may be raised for access to the wrapping machine. By pivoting the end-registering device ER in the manner disclosed herein, the transfer section of the suction conveyor C may still be pivoted to provide access to the wrapping machine. This is particularly desirable in the event a box or wrapper becomes jammed in the wrapping tools of the wrapping machine.

Referring to FIG. 4, it will be noted that a solenoid 63 is carried on the bracket 52. The plunger 64 of the solenoid is connected to one end of an arm 65, the other end of which is secured to the rod 45. The solenoid 63 is energized by way of a switch 66 which in turn is controlled by a cam 67 on the main shaft 13. When the box-wrapping machine is tripped to initiate a cycle of the system, the wrapper conveyor C moves a wrapper W towards the transfer station and prior to its arrival thereat, the end register fingers 40 assume their lower position, as shown in FIG. 4. The leading end of the wrapper W moves against the vertical shoulders 40a and the forward movement of the wrapper W is stopped.

Thereafter the transfer mechanism T (FIG. 3) of the box-wrapping machine moves over the transfer station of the wrapper conveyor C to grip a box B and a wrapper W. As the transfer mechanism T moves the box and wrapper to the wrapping station of the machine M, the solenoid 63 is energized to withdraw the plunger 64 and cause the arm 65 to pivot in a clockwise direction about the rod 45, thus causing the fingers 40 to be raised to a higher elevation above the surface of the belt 39 of the wrapper conveyor C. This is desirable, since at this time the wrapper conveyor C is again advancing to move a wrapper toward the transfer station and during the advancement of the belt 39, the belt tends to vibrate and move its surface into engagement with the shoulders 40a which are spaced closely thereabove. By moving the fingers 40 a substantial distance above the belt 39 during a majority of the forward advancement of the belt, the wear on the belt is minimized.

It is frequently difficult to bring the conveyor belt 39 to a stop without it bouncing back in the reverse direction of travel. This action of the belt causes the wrapper to move with it and thus move out of proper register at the transfer station. To avoid this difficulty, the end register ER is adapted to be adjusted to permit over-travel of the wrapper on the belt and to re-register the wrapper by moving it in the opposite direction to the normal travel of the belt. It will be noted in FIG. 4 that the vertical supports 58 and 59 are interconnected near their lower ends by a pair of links 69 disposed on opposite sides of the vertical members 58 and 59 and through which pass pivot pins 58b and 59b. The links 69 are connected to an operating rod 70, the opposite end of which is pivotally connected at 71 to one end of a centrally-pivoted arm 72, FIG. 5. The central pivot 73 for the double-ended operating arm 72 is supported on a portion of the frame for the box-wrapping machine at a location beneath the suction conveyor. The opposite end of arm 72 is connected by way of a link 74 to an arm 75 connected to the lower end of a vertical shaft 76, the upper end of which is secured to an arm 77. The arm 77 is provided with a cam roller 78 which is adapted to engage a cam 79 carried by the main cam 12 of the box-wrapping machine M. The shaft 76 is mounted in vertical position by bearing members 80. After the suction conveyor C stops and a wrapper W is delivered to the transfer station against the end register ER, the raised portion 79a of cam 79 engages the cam roller 78, causing the connecting member 70 to move to the left in the direction of the arrow in FIG. 5 which in turn causes the end register ER to pivot about the lower pivot members 60a and 60b, thus moving the registering fingers 40 to the left as viewed in FIG. 4. This causes the shoulders 40a to move against the leading edge of the wrapper W and move the wrapper to the left so that its transverse center line is precisely in alignment with the transverse center line of the transfer station.

In FIG. 4, it will be noted that the support 62 has secured to the right-hand end thereof a vertical plate 81 which serves as a backstop for the end register ER. The upper end of plate 81 is provided with an adjustable screw 82 which is adapted to engage the vertical support 59. A tension spring 83 interconnects the backstop 81 with the vertical arm 58 and biases the vertical arms 58 and 59 against the screw 82. The backstop 81 supports the end register ER when the arm 54 thereof is pivoted to the upper phantom-line position shown in FIG. 4. The backstop 81 and spring 83 also cooperate to hold the arms 58 and 59 in a normally vertical position when the end register ER is lowered to its operating position, shown in full-line in FIG. 4. For some applications, it is not necessary to move the wrapper W in reverse direction by means of the end register ER to bring it into registered position. For example, if the amount of bounce-back at the belt 39 can be predetermined, the operating link 70 may be disconnected from the cam-controlled lever 72 and the endwise movement of the end register ER will be eliminated. For this type of operation, the end register ER is so positioned with respect to the transfer station as to compensate for the bounce-back of the belt. This adjustment will be made by means of adjustment knob 42a which in turn adjusts the position of the end register fingers 40 lengthwise of the conveyor.

To insure that the longitudinal center line of the wrapper W is properly positioned at the transfer station, the present system is provided with a side register SR, as now to be described. Referring to FIGS. 6–8, it will be seen that the side register SR includes a pair of registering fingers 85 which are generally similar to the end registering fingers 40 in that they include an end portion which is adapted to extend over the wrapper W and have depending therefrom a shoulder portion 85a which is adapted to engage the side edge of the wrapper W. These wrapper-engaging portions of the side register fingers 85 preferably are provided with Teflon surfaces similar to fingers 40 so as to prevent the adhesive on the wrapper from building up thereon. The fingers 85 are provided at their rear ends with slots 85b through which extend screws 87 which adjustably secure the fingers 85 to carriage members 88. The carriage members 88 are pivotally carried at their rear ends by pins 89 which in turn are carried by adjustable mounting blocks 90. The mounting blocks 90 are interconnected by a slotted bar 91 which is slideably carried by a support 93 which extends beneath the suction conveyor C. The member 93 extends through a fixed support 94 which is secured by screws 95 to a mounting block 96 which in turn is bolted at 97 to the side frames of the suction conveyor C, FIG. 6. The member 93 is provided with a central slot 93a which is adapted to receive a compression spring 98. The slot 93a and the member 94 along with bottom plate 94a and end plate 94b cooperate to form a housing for the compression spring 98. Connected to the underside and at the left-hand end of member 93 as viewed in FIG. 7 is an L-shaped bracket 100, the vertical portion 100a of which is provided with an adjustable stop 101 which is adapted to engage the cross bar 91. The horizontal portion of L-shaped member 100 is secured to member 93 by screws 102. At the right-hand end of slideable member 93 there is provided a hook member 104 which is secured to member 93 by screws 105.

It will be noted that the hook 104 extends under the suction conveyor C and is adapted to engage a cam roller 107 which is carried by an arm 108 movable with arm 72, FIG. 5. When cam 79 and roller 78 are in engagement to move arm 72, the arm 108 likewise will pivot about pivot 73, FIGS. 5 and 6. The movement of lever 108 is in a clockwise direction, as viewed in FIG. 6 and causes the slideable member 93 to move to the right as viewed in FIGS. 6 and 7. This movement causes the spring 98 to be compressed between member 93 and the end plate 94b and at the same time moves the cross bar 91 and the carriage members 88 to the right. The forward ends of the carriage members 88 are provided with rollers 88a which are adapted to ride on the upper surface of a cross guide member 109. The upper surface of guide member 109 is provided with a pair of horizontal surfaces a and c which are separated by an inclined surface b. As the carriages 88 are moved forward under the influence of member 93 and lever 108, the rollers 88a move along the upper horizontal surface a and then down the inclined surface b until they engage the lower horizontal surface c. This in turn causes the registering fingers 85 to move over and down thus bringing the shoulders 85a into engagement with the side edge of the wrapper W and then causing the wrapper to be moved to the right, as viewed in FIGS. 6 and 7 until the longitudinal center line of the wrapper is in precise alignment with the longitudinal center line of the transfer station. This side registering operation is performed concurrently with the end registering operation previously described in connection with the end register ER. The rollers 88a are maintained in engagement with the surfaces a, b and c of member 109 by means of tension springs 110, the opposite ends of which are connected to a pin 88b projecting from carriage 88, FIG. 8, and a pin 111 which is carried at the lower end of an L-shaped arm 112, the upper end of which is secured by a screw 113 to the mounting block 90 on cross bar 91.

Also shown in FIGS. 6–8 are the box supports 116 which extend over the transfer station of the conveyor C. The box supports 116 are secured at their rear ends to mounting blocks 117 which are provided with mounting screws 118 which extend through the longitudinal slot 96a in member 96 which is secured to the side of the conveyor frame by bolts 97. The box supports 116 are adapted to be adjusted lengthwise of the conveyor to accommodate boxes of different lengths. It will be noted that the box supports 116 extend over the transfer station and are spaced above the conveyor belt 39 and the wrapper W a predetermined distance, as shown in FIG. 7. Thus, the box is not moved into engagement at the transfer station but instead is maintained a predetermined distance above the wrapper, the purpose of which was mentioned above. On top of the box supports 116 are rear stop members 120 which are adjustably secured to members 116 by screws 121. The stop members 120 provide a rear stop for the boxes when the transfer machanism T of the wrapping machine moves over the transfer station to engage a box and wrapper preparatory to transfer to the wrapping station. The stop members 120 are provided with slots 120a to adjust the stops to accommodate boxes of different widths. It will be noted that the box stops 120, the box supports 116 and the side register device SR are all carried by the support 96 which is secured to the side frame of conveyor C. Thus, when the transfer section of the conveyor is raised to provide access to the wrapping machine M, the side register SR and associated parts likewise will be raised with the transfer section of the conveyor. The hook member 104 will move out of engagement with the roller 107 from the operating mechanism, thus enabling the operator to have free access to the box-wrapping machine.

After the wrapper 12 has been registered at the transfer station, a box B is moved into place on the box supports 116. As may be seen in FIG. 3, the transfer plunger P₂ is in the act of moving a box B onto supports 116. The box transfer plunger P₂ is provided with a suction head 125 which is adapted to extend into the boxes B and engage the box bottom, as shown in FIGS. 3 and 10. The suction head 125 is connected by way of a pipe 126 and flow passages through pivoted arm 127, as later to be described, to a suction valve 130, FIG. 10. The valve 130 is connected by way of a hose 131 to a suitable source of suction. The housing 133 for valve 130 is disposed in the upper end of a casting 134, the lower end of which is supported on the table of the wrapping machine M. The valve housing 133 is provided with a port 133a, FIG. 9B and FIG. 10, which is adapted to be closed by the head of the valve 130. The stem of the valve 130 extends through the opposite wall of housing 133, FIG. 10, and is provided with a compression spring 136 which is adapted to maintain the head of valve 130 in closed position with respect to the port 133a. As may be seen in FIG. 10, the stem of valve 130 is adapted to be engaged by one end of a pivoted lever 137, the opposite end of which is provided with a cam roller 138, the purpose of which will later be described. As earlier described, the valve 130 may be operated manually by means of an operating lever 28, FIGS. 3 and 10. The operating lever 28 is connected at one end to a rod 141 which extends beneath the extension BC₁ of the box conveyor and is supported at opposite sides of the suction conveyor C by support members 142. The opposite end of the rod 141 is connected to an arm 144 which in turn is connected to a rod 145 which is slideable horizontally in a bearing member 146. The opposite end of rod 145 is adapted to engage the lower end of lever 137 to move it against the stem of valve 130 and compress spring 136, thereby opening the valve port 133a to atmosphere. This cuts off the suction in the passages extending to suction head 125 and prevents the later from picking up a box.

Figure 9B:
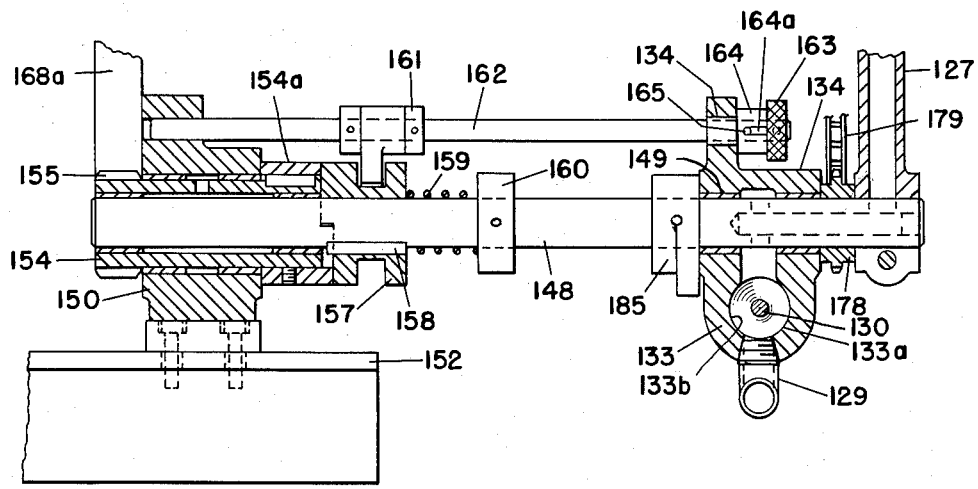
FIG. 9B is a fractional sectional view of the operating mechanism for the box transfer.

As may be seen in FIG. 9, the plunger arm 127 is secured at one end to a shaft 148. The shaft 148 is journalled at one end in a bearing 149, FIG. 9A and FIG. 9B in casting 134 and the opposite end of shaft 148 is journalled in a sleeve bearing 154 journalled in a bearing 150 which is carried by one of the guides 152 for the transfer mechanism T. As may be seen in FIG. 9B, the left-hand end of shaft 148 extends through sleeve bearing 154 which has secured to the outer end thereof a pinion 155. Keyed to the right-hand end of the sleeve bearing 154 is an axially fixed clutch member 154a which mates with a movable clutch member 157 fixed to shaft 148 by key 158. The clutch member 157 is biased into engagement with the clutch member 154a by means of a compression spring 159 which surrounds the shaft 148 and is held in engagement with the clutch member 157 by a collar 160 on shaft 148. An operating member 161 for the clutch member 157 is carried by a rod 162 which is slideably supported at its opposite ends by corresponding bearing members. The right-hand end of rod 162 as viewed in FIG. 9B is provided with an operating knob 163 which is shown in engagement with a collar member 164 which is fixed to the bearing member 134. The collar member 164 is provided with a pair of deep slots 164a which are adapted to receive a pin 165 which extends through the rod 162. At 90° with respect to slot 164a are a pair of shallow slots, not shown, which provide an alternate position for the cross pin 165. By pulling knob 163 to the right, as shown in FIG. 9B, and rotating the knob 90°, the pin 165 will be moved out of the deep slots 164a and move into engagement with the shallow slots. This will cause the operating member 161 for clutch member 157 to move to the right and move the clutch member 157 out of engagement with the mating clutch member 154a. Thus, any movement of the pinion 155 now will not be transmitted to the shaft 148.

As may be seen in FIGS. 9, 9B and 10, the pinion 155 is adapted to mesh with a segment gear 168 which is provided with a crank portion 168a and is pivotally supported at 169. The crank arm 168a is connected by a rod 170 to one arm of a bellcrank 171 which is pivotally supported at 172. The supports for pivots 169 and 172 are carried by a cross member 173, FIG. 10, which extends across the guides 152 for the transfer mechanism T. The opposite arm of bellcrank 171 is provided with a cam roller 174 which is adapted to extend into a groove in a barrel cam 175. The barrel cam 175 is mounted on the vertical shaft 13 of the machine M beneath the main cam 12. The box stop cam 36 previously described is mounted on the bottom end of the box transfer cam 175 and the vacuum valve cam 176 is mounted on the top end of cam 175.

Referring to FIGS. 9A and 9B, it will be seen that between arm 127 which is fixed to shaft 148, and the end of casting 134, there is positioned a sprocket 178 which is fixed to the casting 134. A sprocket chain 179 extends around the fixed sprocket 178 and also around a rotatable sprocket 180. The sprocket 180 is carried by rotatable member 182, journalled in bearing sleeve 182b in the end 127b of arm 127. The opposite end of rotatable member 182 carries a sleeve 183 which supports the pipe 126 which connects to the suction head 125 for gripping the boxes B. It will be noted that rotatable member 182 and sleeve 183 are rotatable as a unit in the outer end 127b of arm 127. It will be noted that the members 126, 182 and 127 are provided with internal passages 126a, 182a and 127a, respectively, which connect with an internal passage 148a in shaft 148, FIG. 9A. The passage 148a connects with the valve chamber 133b in valve housing 133 which in turn connects by way of an elbow 129 (FIG. 10) to hose 131 which leads to the vacuum pump.

When boxes are to be transferred from the box conveyor to the box supports, as in FIG. 3, the clutch knob 163 is moved to the position shown in FIG. 9B with clutch members 157 and 154a in engaged position. The box transfer arm cam 175 is rotated by the main shaft 13 and the cam truck 175a in cam 175 is effective on cam roller 174 to pivot the bellcrank 171 about its pivot 172, thereby causing rod 170 to pivot the segment gear 173 about its pivot 169 to rotate the pinion 155. Since the clutch member 154a, to which pinion 155 is fixed, is coupled to the shaft 148 by the clutch member 157, the plunger arm 127 is adapted to rotate from its full-line position in FIG. 10 in a clockwise direction to its broken-line position where the box B is deposited on the box supports 116 which extend over the transfer station above the suction conveyor. Since the sprocket 178 is a fixed sprocket, and the sprocket 180 is a movable sprocket, the rotation of arm 127 will cause the sprocket chain 179 to rotate member 182 about its axis and it will maintain the suction member 125 and the box carried thereby in a substantially horizontal plane as it is transferred from its position on the box conveyor $BC_1$ to its position on the box supports at the transfer station. When the box has been transferred to the box supports 116, the cam track 175a in the box transfer cam 175 is so shaped as to provide a short dwell to insure release of the box B from the suction head 125, followed by movement of the box transfer arm 127 in a counterclockwise direction from the dotted line position in FIG. 10 to the solid line position preparatory to transferring a succeeding box.

Since the boxes are held to the member 125 by suction, it is necessary that the suction be cut off during the short dwell in order that the box will be deposited on the box supports 116 at the transfer station. This is accomplished automatically by the lever 137 which is pivoted intermediate its ends with the lower end being adapted to engage the stem end of valve 130 while the upper end of lever 137 is provided with a cam roller 138 as shown in FIGS. 8, 9 and 10. As may be seen in FIG. 9, the pivot 137a for lever 137 is carried by the casting 134. Pinned to shaft 148 is a cam 185 adapted to engage roller 138 for moving the lever 137 against the end of stem 130 and thereby compressing the spring 136 and opening the port 133a to atmosphere. The cam 145 is so shaped that this operation takes place during the last 10° of movement of box transfer arm 127 causing the box to be deposited on the box supports 116. When the arm 127 moves from its box-depositing position at the transfer station in reverse direction to its box-pickup position, the compression spring 136 closes port 133a and valve 133, re-applying suction to the suction head 125 so that it is ready to pick up a box upon its return to the box-pickup position shown in full-line in FIG. 10. The movement of the box transfer plunger $P_2$ is so timed with respect to the operation of the transfer mechanism T of the wrapping machine M that the suction member 125 is removed from the box B at the transfer station before the transfer mechanism engages the box and wrapper to transfer them from the transfer station to the wrapping station of the wrapping machine M.

After the box and wrapper have been positioned in spaced registered relation at the transfer station, they are ready to be transferred to the wrapping station of the box-wrapping machine M. This is accomplished by the transfer mechanism T as now to be described in connection with FIGS. 11 and 12. The transfer mechanism T is generally similar to the transfer mechanism disclosed in Fig 16 of the aforesaid Lange et al. patent. However, provision has been made in the present system for positive vertical movement of the suction members in accordance with a predetermined sequence now to be described. As may be seen in FIG. 11, the transfer mechanism T includes a pair of spaced tubular transfer members 210 having box-gripping fingers 211 pivotally supported as by bolts 212, at their forward ends. The fingers 211 are biased to a gripping position by tension springs, not shown. Channel members 213 disposed on the inner sides of the transfer members 210 provide for adjustment of the front box stops 214 which cooperate with the fingers 211 to grip the opposite corners of the box B. As is explained and illustrated in the aforesaid patent to Lange et al., tubular members 210 are slidably mounted in frame brackets 210a at each side of the transfer mechanism T (FIG. 11). Members 210 are adjustably clamped by bolts 241 and clamps 241a to a crossbar 242 slidable in rails 152. The crossbar has ears 242a connected to a carriage-reciprocating link 242b. Line 242b is operated by a crank (not shown) driven by the main drive mechanism. The suction members 215 which are adapted to engage the leading flap of the wrapper W are carried by hollow blocks 217 which are disposed within the tubular transfer members 210, FIG. 11. The interior of the blocks 217 are connected to pipes 218 which extend through suitable packing material (not shown) in the transfer members 210 and thus form a suction path from the rear ends 210a of transfer members to the suction blocks 217. The ends 210a of transfer members 210 are adapted to be provided with hose connections 210b, FIG. 13, which extend by way of line 210c to a vacuum pump, not shown, and provide suitable suction.

As may be seen in FIGS. 11 and 12, the suction members 215 have an outer housing 220 which is supported by a member 221 which in turn is secured to block 217 by a screw 222. The suction member 215 is adapted for vertical movement, FIG. 12, within the housing 220. The suction member 215 is provided with a port 215a in the side wall thereof which is adapted to communicate with a vertical slot 220a in the adjacent side wall of the housing 220. The slot 220a is in communication with a tubular member 224 which in turn communicates with the chamber within block 217. Thus, a suction path is completed from each suction member 215, through port 215a, slot 220a, tubular member 224, block 217 and pipe 218 to the interior of transfer member 210, the rear end 210a of which is connected by way of the hose 210b to the source of suction. The screw 222 is adapted to lock the suction block 217 along with the suction member 215 in the desired location on the transfer member 210 to accommodate the particular size wrapper being applied to the box. The screw 222 additionally provides a pivotal support for a segment gear 225. The teeth 226 on the segment gear are adapted to engage corresponding teeth on the side of the suction member 215. The segment gear 225 is provided with an arm 230 which is connected to a block 231 secured to a reciprocating rod 232. The forward end of the rod 232 is carried in a guide 233 and the rear end of rod 232 passes through a guide 234. The rods 232 are provided with compression springs 236 which extend therearound and are adapted to be positioned between the rear guides 234 and a collar 237 which is secured to the rods 232. The rear ends of the rods 232 are connected to a cross rod 239, the opposite ends of which are connected to lower ends of arms 240. The upper ends of arms 240 are secured to a cross rod 241 which is journalled in support members 243 carried by the carriage bar 242. Also secured to the cross rod 241 are operating arms 245 which at their outer ends are provided with cam rollers 246 adapted to ride on a cam 247 which is carried by the transfer guides 152. The cam 247 has a rise 247a at one end and a similar rise 247b at the opposite end with a flat or horizontal surface interconnecting these rises. The transfer mechanism T has a fixed length of stroke and the cam 247 has a length corresponding to the stroke length. Thus, it will be seen that at each end of the stroke, the cam roller 246 will engage the sloping portions 247a and 247b of the cam while during the remainder of the stroke, the cam roller 246 will be on the upper level of the cam between areas 247a and 247b. When the transfer mechanism T is at the wrapping station, the cam roller 246 will be on cam surface 247a and the suction member 215 will assume the lower position shown in full-line in FIG. 12. When the transfer mechanism moves from the wrapping station over the transfer station, the cam roller moves to the upper flat surface of cam 247 causing the arm 245 to pivot in a clockwise direction which rotates rod 241 and in turn rotates arm 240 in a similar direction causing the rods 232 to move to the left as viewed in FIG. 12 against the compression of springs 236. This movement of rods 232 causes the segment gears 225 to rotate in a counter-clockwise direction thereby raising the suction members 215 upwardly in a vertical direction until they assume the phantom-line position shown in FIG. 12 adjacent the full-line showing of suction member 215. During the transfer of the transfer mechanism T to the transfer station, the suction members 215 maintain the raised or retracted position until just prior to arrival over the wrapper W at the transfer station. The type of path is graphically illustrated in FIG. 12 by the dotted line and phantom line positions of the suction members 215. At this time the cam roller 246 moves down the slope 247b thereby lowering the suction members 215 into engagement with a wrapper on the suction conveyor at the transfer station. At this time the forward box-gripping fingers 211 have moved along the end walls of the box B to grip the rear corners and force the front corners of the box against the front box stops 214 (FIG. 11). The box B and wrapper W have now been locked in a spaced registered relation and this registered relation is accurately maintained during the entire simultaneous transfer of the box and wrapper from the transfer station to the wrapping station. The box is supported by spring-actuated fingers 211 in conjunction with fixed stops 214 so that the box is spaced above the wrapper about 3/8".

When the transfer mechanism starts its return movement to the wrapping station, the cam rollers 246 move up the cam slope 247b causing the arms 245, rods 241 and arms 240 to move in a counterclockwise direction which in turn causes the rods 232 to move to the left and rotate the segment gears 225 to raise the suction members 215 to their elevated phantom-line position. This elevated position is maintained during the entire return stroke of the transfer mechanism T until just prior to the completion thereof. This elevated position assures that the leading edge of the wrapper W which is supported by the suction members 215 will be at an elevation sufficiently high to clear the platen 223 of the box-wrapping machine and thus avoid any damage to the wrappers. As the transfer mechanism arrives at the wrapping station, the cam rollers 246 ride down the slopes 247a and return to their original position as shown in FIGS. 11 and 12, thus returning the suction members 215 to their full-line position as shown in FIG. 12. From FIG. 12 it will be noted that the wrapper W has now been returned to the same elevation at the wrapping station that it originally occupied at the transfer station with respect to the box B. During transfer, the accurate register which was obtained at the transfer station will be maintained, so that the parts also register at the wrapping station. It is necessary to maintain this accurate register in order that the center of the wrapper will be precisely applied to the center of the box B and thus insure a perfect wrapping operation. This is extremely important when the wrappers are provided with a design, the appearance of which would be impaired if the design were applied to the box off center.

With the box and wrapper registered in spaced relation at the wrapping station, the suction to the suction members 215 is cut off to release the wrapper W. This is accomplished by opening the suction line 210c to atmosphere. It will be noted that in line 210c there is a valve 260, the valve element 260a of which is maintained normally closed by a spring 261. The valve element 260a is connected to a solenoid 262 which is in circuit with a cam-operated switch 263. The operating cam 176, FIG. 13, is carried at the top end of the box transfer cam 175. The lobe on cam 176 is so shaped as to close switch 263, energizing solenoid 262 and opening valve 260 to atmosphere when the box and wrapper are registered at the wrapping station. Thereafter, the valve 260 is closed and suction re-applied to the suction members 215. The wrapping machine M then operates to clamp the box and wrapper between the platen 223 and the form block F in registered relation. The box-wrapping tools then complete the application of the wrapper to the box and the completed box is ejected from the machine by ejectors 250, FIG. 11, in the manner described in the aforesaid Lange et al. patent.

The suction members 215 preferably are provided at their lower end with a face or tip of Teflon for engaging the adhesively-coated surface of the wrapper. Their construction is similar to that described and illustrated in the aforesaid Lange et al. patent. However, the tips of the suction members 215 need not be made of Teflon for loose-wrap work since the suction members 215 may be adjusted to engage the wrapper at a non-adhesive coated area.

While the present system 10 has been primarily described in connection with loose-wrap work, it is also adapted for tight-wrap work. The tight-wrap work may be performed by using either the plunger P at register station R, or by using plunger $P_2$ at register station $R_2$. When using register R, the system is operated in the same manner as described in the aforesaid Andresen et al. patent. When using the second registering station $R_2$ for tight-wrap work, the gluer G applies an adhesive coat over the entire face of the wrapper rather than just to the marginal edges as for loose-wrap work. The adhesive-coated wrapper W is registered at the transfer station by both the end register device ER and the side register device SR and the box B is deposited on the box supports 116 by the swinging plunger $P_2$. It is to be noted that the box is not moved into engagement with the wrapper at the transfer station and thus there is avoided any possibility of shifting the alignment of the box with the wrapper due to resiliency of the spring biased suction cup 125 on the plunger $P_2$. The adhesive-covered wrapper and box are then transferred in spaced registered relation by the transfer mechanism T to the wrapping station, where for the first time, the box and wrapper are brought into positive engagement and the wrapper adhesively applied to the box by the wrapping tools of the box machine M.

Thus it will be seen that the present system 10 is suitable for the loose-wrap of boxes and it is suitable for producing tight-wrap boxes by two different methods. By using the second registering station $R_2$ for tight-wrap work, the adhesive applied to the wrapper has adequate time to penetrate the wrapper W and thus avoid possible blistering of the wrapped boxes.

While a preferred embodiment of this invention has been described and illustrated, it shall be understood that the invention is not limited to the specific arrangement shown and that changes and modifications may be made within the scope of the appended claims.

What is claimed is:

1. In a box-wrapping system having a transfer station and a wrapping station, means at said transfer station for supporting a box in spaced registered position above a wrapper, box-gripping structure movable between said stations for transferring a box from the transfer station to the wrapping station, suction means movable between said stations for supporting a wrapper for movement from the transfer station to the wrapping station, means for supporting both said box-gripping means and said suction means in spaced relation for concurrent transfer thereof with a registered box and wrapper between said stations, and means for moving said suction means to a different elevation with respect to said box-gripping means at both of said stations as compared to its position between said stations to maintain the register of the box while varying the spacing therebetween.

2. In a box-wrapping system according to claim 1 wherein said means for moving said suction means comprises a stationary cam bar having a slope at either end, lever means pivoted to said supporting means for said suction means, cam follower means on one end of said lever means adapted to engage said cam bar, and structure on the opposite end of said lever means and engageable with said suction means for raising and lowering said suction means in accordance with the shape of said cam bar.

3. In a box-wrapping system having a transfer station and a wrapping station, means at said transfer station for supporting a box in spaced registered position above a wrapper, box-gripping structure movable between said stations for transferring a box from the transfer station to the wrapping station, suction means movable between said stations for transferring a box from the transfer station to the wrapping station, suction means movable between said stations for supporting the wrapper for movement from the transfer station to the wrapping station, means for supporting both said box-gripping means and said suction means in spaced relation during the transfer of a box and wrapper thereby between said stations, means for moving said suction means to a different elevation with respect to said box-gripping means at both said stations as compared to its position between said stations, and means for shutting off the suction to said suction means when said suction means is at the wrapping station.

4. For use in an automatic box-wrapping system for "loose-wrap" work wherein the wrappers have unset adhesive only along their edges, apparatus for supplying registered but unadhered box and wrapper assemblies to a wrapping machine, said apparatus comprising an intermittently driven box conveyor, a pick up station at the end of said box conveyor, a box stop at said pick up station, an intermittently driven wrapper conveyor disposed below and extending in the same direction as said box conveyor, a transfer station, said wrapper conveyor extending past said pick up station to said transfer station, end registration means for the wrappers at said transfer station, reciprocating box pick up means movable in the line of motion of said conveyors between said pick up and transfer stations for transferring boxes in succession from said pick up station into register with corresponding wrappers on the wrapper conveyor at said transfer station, a wrapping station at one side of said transfer station, and transfer means movable transversely of said wrapper conveyor between said transfer and wrapping stations for transferring in succession unadhered box and wrapper assemblies from said transfer station to said wrapping station.

5. For use in an automatic box-wrapping system for "loose-wrap" work wherein the wrappers have unset adhesive only along their edges, apparatus for supplying registered but unadhered box and wrapper assemblies to a wrapping machine, said apparatus comprising an intermittently driven box conveyor, a pick up station at the end of said box conveyor, a box stop at said pick up station, an intermittently driven wrapper conveyor disposed below and extending in the same direction as said box conveyor, a transfer station, said wrapper conveyor extending past said pick up station to said transfer station, end registration means for the wrappers at said transfer station, relatively thin flat box supporting means overlying wrappers at said transfer station, reciprocating box pick up means movable in the line of motion of said conveyors between said pick up and transfer stations for transferring boxes in succession from said pick up station to said box support means and into register with corresponding wrappers on the wrapper conveyor at said transfer station, a wrapping station at one side of said transfer station, and transfer means movable transversely of said wrapper conveyor between said transfer and wrapping stations for transferring in succession unadhered, vertically spaced box and wrapper assemblies from said transfer station to said wrapping station.

6. In a box wrapping system according to claim 5 wherein said box pick up means comprises an oscillatory arm, a suction head pivotally mounted on the end of said arm, and means for maintaining said suction head horizontal during oscillation of said arm.

7. In a box-wrapping system, a frame, a transfer station, an intermittently driven conveyor for transporting wrappers to said transfer station, a side register device for wrappers at said transfer station, said side register device including finger means disposed over the wrapper conveyor at said transfer station and having depending portions for engaging the side of a wrapper, means for shifting said finger means transversely of said wrapper conveyor in a direction to push the wrappers laterally into final lateral registration on the conveyor, roller means for supporting said finger means at a position spaced above said transfer station, and cam means on said frame for supporting said roller means, said cam means having a pair of spaced horizontal surfaces interconnected by an inclined surface for engagement by said roller means to guide said finger means over said transfer station and down into engagement with the side edge of a wrapper upon operation of said finger shifting means.

8. In a box-wrapping system, a transfer station, an intermittently driven conveyor for transporting wrappers to said transfer station, an end register device at said transfer station for engaging the leading edge of a wrapper on said conveyor, a side register device supported at the transfer station and adapted to move the same wrapper transversely of said conveyor, and means for concurrently operating said end register and side register devices for establishing precise end and side registration of each wrapper at said transfer station.

9. In a box-wrapping system, a transfer station, an intermittently driven wrapper conveyor for transporting wrappers to said transfer station, an end register device at said transfer station, said end register device including finger means extending over the surface of said conveyor for engaging the leading edge of a wrapper, means for supporting said finger means for upward movement relative to said conveyor, and means for lifting said finger means when said conveyor is being driven in order to completely clear the moving conveyor.

10. In a box-wrapping system according to claim 9, means for cyclically moving said end register device in a direction opposite to the direction of travel of the conveyor to push a wrapper at the transfer station back to its precise register position.

11. A method of transferring a box and wrapper to a wrapping station comprising the steps of registering a box longitudinally and transversely at a transfer station, registering a box with the wrapper while supporting the box a short distance from the wrapper, transferring the box and wrapper while in spaced, registered relation to the wrapping station, and thereafter bringing the box against the wrapper for subsequent application of the wrapper to the box.

12. Apparatus for providing a wrapping station with a box and an unadhered wrapper, said apparatus comprising a transfer station, means for registering a wrapper both longitudinally and transversely at said transfer station, flat box support means extending over a wrapper at said transfer station, means for registering a box with the wrapper on said box support means, and means for transferring the box and wrapper in vertically spaced registered relation from said transfer station to the wrapping station for subsequent application of the wrapper to the box.

References Cited in the file of this patent

UNITED STATES PATENTS

| | | |
|---|---|---|
| 2,144,338 | Lange | Jan. 17, 1939 |
| 2,152,775 | Stokes | Apr. 4, 1939 |
| 2,757,586 | Haessler | Aug. 7, 1956 |
| 2,867,158 | Andresen et al. | Jan. 6, 1959 |
| 2,904,192 | Reynolds et al. | Sept. 15, 1959 |
| 2,938,636 | Miller | May 31, 1960 |
| 2,958,267 | Wolff et al. | Nov. 1, 1960 |
| 2,961,931 | Von Hufe et al. | Nov. 29, 1960 |